US009128352B2

(12) United States Patent
Jendbro et al.

(10) Patent No.: US 9,128,352 B2
(45) Date of Patent: Sep. 8, 2015

(54) CONTROLLING DIRECTION OF LIGHT ASSOCIATED WITH A FLASH DEVICE (75) Inventors: Magnus Jendbro, Staffanstorp (SE); Pär Stenberg, Veberöd (SE); Gunnar Klinghult, Lund (SE); Andreas Kristensson, Södra Sandby (SE); Ola Thörn, Limhamn (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 343 days.

(21) Appl. No.: 13/882,814

(22) PCT Filed: Jul. 3, 2012

(86) PCT No.: PCT/IB2012/001314
§ 371 (c)(1),
(2), (4) Date: May 1, 2013

(87) PCT Pub. No.: WO2014/006435
PCT Pub. Date: Jan. 9, 2014

(65) Prior Publication Data
US 2014/0362229 A1 Dec. 11, 2014

(51) Int. Cl.
H04N 5/225 (2006.01)
G03B 7/0805 (2014.01)
(Continued)

(52) U.S. Cl.
CPC ............ *G03B 7/0805* (2013.01); *G03B 7/08* (2013.01); *G03B 15/03* (2013.01); *H04N 5/2256* (2013.01);
(Continued)

(58) Field of Classification Search
USPC .......... 348/169, 49, 50, 64, 68, 94, 131, 135, 348/136, 137, 140, 142, 145, 158, 166, 345, 348/362, 364, 365, 370, 371, 376, 714, 719, 348/801; 362/3, 4, 5, 16, 18, 19, 23.02, 362/23.14, 23.2, 26, 244, 277, 285, 297, 362/319, 326, 327, 347, 486, 510, 516, 552, 362/555, 644, 623; 396/62, 79, 80, 104, 396/151, 164, 174, 175, 200, 296; 359/577, 359/584, 850, 853, 869
See application file for complete search history.

(56) References Cited

U.S. PATENT DOCUMENTS 4,658,130 A * 4/1987 Durbin .......................... 212/285
5,614,970 A   3/1997 Takagi et al.
(Continued)

FOREIGN PATENT DOCUMENTS

JP   2005-156595   6/2005

OTHER PUBLICATIONS

International Search Report and Written Opinion of International Application No. PCT/IB2012/001314, dated Apr. 19, 2013.

*Primary Examiner* — Jefferey Harold
*Assistant Examiner* — Mustafizur Rahman
(74) *Attorney, Agent, or Firm* — Renner, Otto, Boisselle & Sklar, LLP (57) ABSTRACT A flash device includes a light emitting element configured to emit light and light controlling elements. The light controlling elements include a light receiving surface and a light exiting surface that is non-parallel to the light exiting surface of an adjacent light controlling element. The light controlling elements are individually adjustable to vary a difference between an amount of light received at the light receiving surface and an amount of light exited from the light exiting surface such that amounts of light exiting respective non-parallel light exiting surfaces vary to control direction of light emitted by the flash device.

20 Claims, 8 Drawing Sheets (51) Int. Cl.
  *G03B 15/03* (2006.01)
  *G03B 7/08* (2014.01)
  *H04N 5/232* (2006.01)
  *H04N 5/235* (2006.01)

(52) U.S. Cl.
  CPC .......... *H04N 5/2351* (2013.01); *H04N 5/2354* (2013.01); *H04N 5/23293* (2013.01); *G03B 2215/051* (2013.01); *G03B 2215/0521* (2013.01)

(56) References Cited

U.S. PATENT DOCUMENTS

| | | | |
|---|---|---|---|
| 6,445,886 B1* | 9/2002 | Muramatsu et al. | 396/225 |
| 6,771,898 B2 | 8/2004 | Bean et al. | |
| 7,066,634 B2* | 6/2006 | Kitamura et al. | 362/616 |
| 7,616,881 B2 | 11/2009 | Liang et al. | |
| 7,920,205 B2 | 4/2011 | Awazu | |
| 2003/0146995 A1* | 8/2003 | Takahashi et al. | 348/308 |
| 2004/0190279 A1* | 9/2004 | Kitamura | 362/26 |
| 2005/0253956 A1* | 11/2005 | Ono | 348/362 |
| 2005/0264682 A1* | 12/2005 | Kurane | 348/362 |
| 2007/0127869 A1* | 6/2007 | Kirk | 385/37 |
| 2007/0216797 A1* | 9/2007 | Yoshida et al. | 348/370 |
| 2009/0208198 A1 | 8/2009 | Khuntia | |
| 2009/0278979 A1 | 11/2009 | Bayerl et al. | |
| 2009/0284646 A1 | 11/2009 | Chao | |
| 2010/0027268 A1 | 2/2010 | Lin | |
| 2010/0123858 A1* | 5/2010 | Han et al. | 349/65 |
| 2010/0149828 A1* | 6/2010 | Koizumi | 362/512 |
| 2011/0085333 A1* | 4/2011 | Ohno et al. | 362/244 |
| 2011/0085343 A1* | 4/2011 | Ohno et al. | 362/510 |
| 2011/0116044 A1* | 5/2011 | Nozato et al. | 351/206 |
| 2012/0014683 A1 | 1/2012 | Gudlavalleti et al. | |

* cited by examiner

CONTROLLING DIRECTION OF LIGHT ASSOCIATED WITH A FLASH DEVICE

TECHNICAL FIELD OF THE INVENTION

The technology of the present disclosure relates generally to image capturing devices and particularly to flash devices and methods of controlling direction and/or intensity of light associated with the flash devices.

BACKGROUND

In photography a flash device is used in cases where not enough light is available for an image capturing apparatus to take a satisfactory image of a subject. The flash device provides additional light. However, flash light directed directly at the subject and having uncontrolled intensity often creates conditions where the lighting is too harsh for the image capturing apparatus to take a satisfactory image of the subject.

Conventionally, flash devices designed to address this issue are configured to mechanically tilt or move to adjust the flash device such that flash light from the flash device may be directed to bounce off surfaces or objects other than the subject to be photographed. The flash light illuminates the subject in an indirect or diffused manner. However, these conventional flash devices have disadvantages including often requiring the user to manually tilt or move the flash device, making the process inconvenient and inexact. Also, these conventional devices and methods often do not provide control of the intensity of the flash light.

SUMMARY

The present disclosure provides flash devices and methods of controlling direction of light associated with the flash devices that does not involve mechanical movement. Providing flash devices and methods of controlling direction of light associated with the flash devices that do not involve mechanical movement, among other potential benefits, helps provide an image capturing apparatus such as a camera or a mobile telephone the ability to intelligently control the direction and/or intensity of light from the flash device without or with minimized user intervention.

Electronic devices, particularly consumer products such as cameras, mobile telephones, mobile navigation systems, gaming devices, media players, and so on, may benefit from these improved flash devices and methods to be used in combination with more complex and advanced applications.

According to one aspect of the invention, an image capturing apparatus comprises a photometric logic configured to measure light incident on objects in the field of view of the image capturing apparatus and a flash device. The flash device comprises a light emitting element configured to emit light and light controlling elements. The light controlling elements comprise a light receiving surface and a light exiting surface that is non-parallel to the light exiting surface of an adjacent light controlling element of the flash device. The light controlling elements are individually adjustable to vary a difference between an amount of light received at the light receiving surface and an amount of light exited from the light exiting surface. The image capturing also comprises a flash controlling logic operatively connected to the photometric logic and the flash device, and configured to control the light controlling elements to vary the difference between the amount of light received at the light receiving surfaces and the amount of light exited from the non-parallel light exiting surfaces based on the measured light incident on the objects in the field of view of the image capturing apparatus. The flash controlling logic is configured to vary the difference between the amount of light received at the light receiving surfaces and the amount of light exited from the light exiting surfaces individually for the light controlling elements to control direction of light emitted by the flash device.

In one embodiment, the light controlling elements include three light controlling elements where respective light exiting surfaces of the three light controlling elements are each non-parallel to the light exiting surfaces of each other of the three light controlling elements.

In another embodiment, the light controlling elements include four light controlling elements where the light exiting surfaces of the four light controlling elements are non-parallel to at least one of the light exiting surfaces of each other of the four light controlling elements.

In yet another embodiment, the flash controlling logic is configured to control the light controlling elements for the light controlling elements to interchangeably transmit, absorb, or reflect at least a portion of the light emitted by the light emitting element.

In one embodiment, the image capturing apparatus comprises an imaging element having an optical axis and the light controlling elements include at least one light controlling element comprising a light exiting surface having a normal that is non-parallel to the optical axis of the imaging element.

In another embodiment, the image capturing apparatus comprises an imaging element having an optical axis and the light controlling elements include at least one light controlling element comprising a light exiting surface having a normal that is substantially orthogonal to the optical axis of the imaging element.

In yet another embodiment, the image capturing apparatus comprises an imaging element having an optical axis and the light controlling elements include at least one light controlling element comprising a light exiting surface disposed relative to the optical axis of the imaging element such that at least some of the light emitted by the light emitting element exits the flash device substantially in a direction outside the field of view of the image capturing apparatus.

In one embodiment, the light controlling elements comprise smart glass configured to change light transmission properties of the light controlling elements in response to a stimulus.

In another aspect of the invention, a method of controlling direction of light associated with a flash device comprises emitting light as a result of a signal received, controlling non-mechanical light controlling elements to variably redirect at least some of the emitted light, and at least partially by means of the non-mechanical light controlling elements variably transmit, absorb, or reflect a portion of the emitted light such that in a first setting the portion exits the flash device in a first direction and in a second setting the portion exits the flash device in a second direction orthogonal to the first direction.

In one embodiment, the method comprises measuring light incident on objects in the field of view of the image capturing apparatus and the controlling the non-mechanical light controlling elements is based on the light measurement.

In another embodiment, the controlling the non-mechanical light controlling elements includes controlling the non-mechanical light controlling elements such that portions of the emitted light exit the flash device in multiple directions excluding a direction that is parallel to the optical axis of an image capturing apparatus associated with the flash device.

In yet another embodiment, the controlling the non-mechanical light controlling elements includes controlling the non-mechanical light controlling elements such that the portion of the emitted light exits the flash device substantially in a direction outside the field of view of an image capturing apparatus associated with the flash device.

In yet another aspect of the invention, a flash device comprises a light emitting element configured to emit light and light controlling elements. The light controlling elements comprise a light receiving surface and a light exiting surface that is non-parallel to the light exiting surface of at least one other light controlling element of the flash device. The light controlling elements are individually adjustable to vary a difference between an amount of light received at the light receiving surface and an amount of light exited from the light exiting surface such that amounts of light exiting respective non-parallel light exiting surfaces vary to control direction of light emitted by the flash device.

In one embodiment, the light controlling elements include three light controlling elements, wherein respective light exiting surfaces of the three light controlling elements are each non-parallel to the light exiting surfaces of each other of the three light controlling elements.

In another embodiment, the light controlling elements include four light controlling elements, wherein the light exiting surfaces of the four light controlling elements are non-parallel to at least one of the light exiting surfaces of each other of the four light controlling elements.

In yet another embodiment, the light controlling elements are configurable to interchangeably transmit or reflect at least a portion of the light emitted by the light emitting element.

In one embodiment, the light controlling elements include at least one light controlling element comprising a light exiting surface having a normal that is non-parallel to an optical axis of an imaging element associated with an image capturing apparatus working in conjunction with the flash device.

In another embodiment, the light controlling elements include at least one light controlling element comprising a light exiting surface having a normal that is substantially orthogonal to an optical axis of an imaging element associated with an image capturing apparatus working in conjunction with the flash device.

In yet another embodiment, the light controlling elements include at least one light controlling element comprising a light exiting surface disposed relative to an optical axis of an imaging element of an image capturing apparatus working in conjunction with the flash device such that at least some of the light emitted by the light emitting element exits the flash device substantially in a direction outside a field of view of the image capturing apparatus working in conjunction with the flash device.

In one embodiment, the light controlling elements comprise smart glass configured to change light transmission properties of the light controlling elements in response to a stimulus.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

In the present disclosure, embodiments are described primarily in the context of a mobile telephone. It will be appreciated, however, that the exemplary context of a mobile telephone is not the only operational environment in which aspects of the disclosed systems and methods may be used. Therefore, the techniques described in this disclosure may be applied to any type of appropriate electronic device, examples of which include a mobile telephone, a media player, a gaming device, a computer, a television, a video monitor, a multimedia player, a DVD player, a Blu-Ray player, a pager, a communicator, an electronic organizer, a personal digital assistant (PDA), a smartphone, a portable communication apparatus, etc.

Figure 1A:
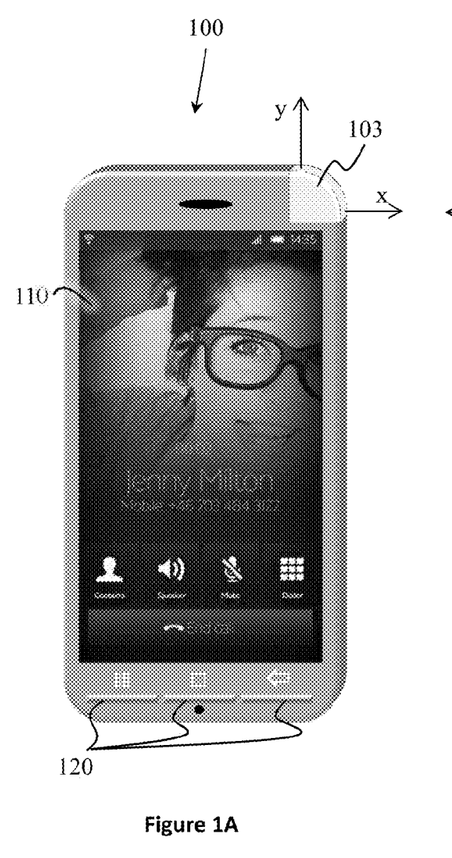
FIGS. 1A and 1B illustrate front and back views of an exemplary mobile phone.
Figure 1B:
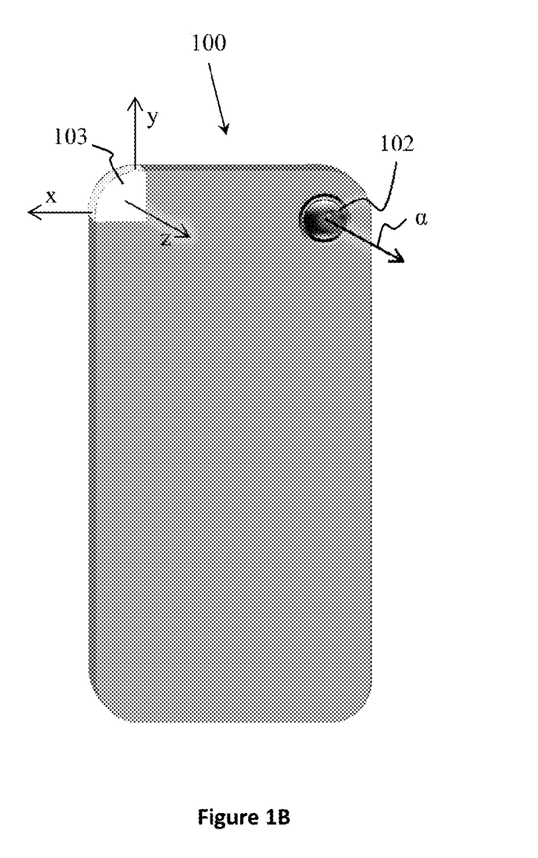

FIGS. 1A and 1B illustrate front and back views of an exemplary mobile phone 100. The phone 100 includes an imaging element 102 that has an optical axis $\alpha$. The phone 100 also includes a flash device 103 that works in conjunction with the imaging element 102 at least when the phone 100 is used as an image capturing device. As described in more detail below, the flash device 103 is capable of selectively emitting flash light at least in a z-direction substantially parallel to the optical axis $\alpha$, in a y-direction substantially orthogonal to the optical axis $\alpha$, in an-x direction substantially orthogonal to the optical axis $\alpha$, and combinations thereof. Thus, for example, in circumstances where it is desired for flash light to be directly directed at a subject in the field of view of the imaging element 102, the flash device 103 emits flash light in the z-direction substantially parallel to the optical axis α. However, in circumstances where flash light is needed, but it is not desired for flash light to be directly directed at the subject in the field of view of the imaging element 102, the flash device 103 emits flash light in the y-direction substantially orthogonal to the optical axis α or in the x-direction also substantially orthogonal to the optical axis α so that the flash light may reflect off surfaces in the space around the phone 100 and the subject in the field of view of the imaging element 102, but the flash light is not directly directed at the subject. The flash device 103 accomplishes this without mechanical movement associated with the selection of the direction of the flash light.

The phone 100 is illustrated as having a "brick" or "block" form factor housing, but it will be appreciated that other housing types may be utilized, such as a "flip-open" form factor (e.g., a "clamshell" housing) or a slide-type form factor (e.g., a "slider" housing).

The phone 100 includes a graphical user interface (GUI) 110. The GUI 110 displays information to a user, such as operating state, time, telephone numbers, contact information, various menus, etc., that enable the user to utilize the various features of the phone 100. The GUI 110 may also be used to visually display content received by the phone 100 or content retrieved from memory of the phone 100. The GUI 110 may be used to present images, video, and other graphics to the user, such as photographs, pictures or movies taken with the imaging element 102, mobile television content, and video associated with games.

The phone 100 further includes a keypad 120 that provides for a variety of user input operations. Although, three keys are illustrated in the keypad 120, the keypad 120 may include more or fewer than three keys. For example, the keypad 120 may include alphanumeric keys for allowing entry of alphanumeric information such as telephone numbers, phone lists, contact information, notes, text, etc. In addition, the keypad 120 may include special function keys such as a "call send" key for initiating or answering a call and a "call end" key for ending or "hanging up" a call. Special function keys also may include menu navigation keys, for example, to facilitate navigating through a menu displayed on the GUI 110. For instance, a pointing device or navigation key may be present to accept directional inputs from a user or a select key may be present to accept user selections. Other keys (not shown) associated with the phone 100 may include a volume key, an audio mute key, an on/off power key, a web browser launch key, etc. In some embodiments, the GUI 110 may incorporate the keypad 120 in the sense that any keys in the keypad 120 may be virtual keys that a user may press by interacting with the GUI 110. Also, the GUI 110 and keypad 120 may be used in conjunction with one another to implement soft key functionality.

Figure 2:
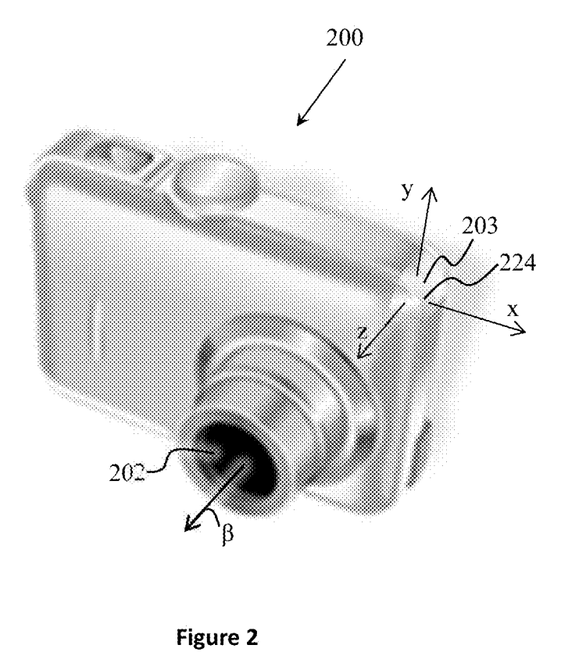
FIG. 2 illustrate an image capturing apparatus.

FIG. 2 illustrate an image capturing apparatus 200. Similar to the phone 100 described above, the image capturing apparatus 200 includes an imaging element 202, which has an optical axis β. The image capturing apparatus 200 also includes a flash device 203 that works in conjunction with the imaging element 202. A user of the image capturing apparatus 200 may wish to capture an image of a subject in the field of view of the image capturing apparatus 200. In one embodiment, the user or the image capturing apparatus 200 makes a determination that additional light is needed for a satisfactory image of the subject to be obtained and thus the flash device 203 should be used when capturing the image. The user or the image capturing apparatus 200 also makes a determination that flash light directed directly at the subject would result in a captured image that is less than satisfactory. Reflecting or bouncing the light off surfaces around the subject or the image capturing apparatus 200 (e.g., walls, ceiling, furniture, etc.), but outside the field of view of the image capturing apparatus 200 would result in a more satisfactory image. The flash device 203 is capable of emitting flash light in a z-direction substantially parallel to the optical axis α. Moreover, as described in more detail below, the flash device 203 is capable of emitting flash light in a y-direction substantially orthogonal to the optical axis β and in an x-direction substantially orthogonal to the optical axis β (e.g., the flash device 203 has a light exiting surface that has a normal that is non-parallel, and in some embodiments orthogonal, to the optical axis β of the imaging element 202). Thus, in the circumstances described above, the flash device 203 may emit flash light in the y-direction or the x-direction so that the flash light bounces off the ceiling, walls, objects, or surfaces, and is not directly directed at the subject. The flash device 203 accomplishes this without mechanical movement associated with the selection of the direction of the flash light.

Figure 3:
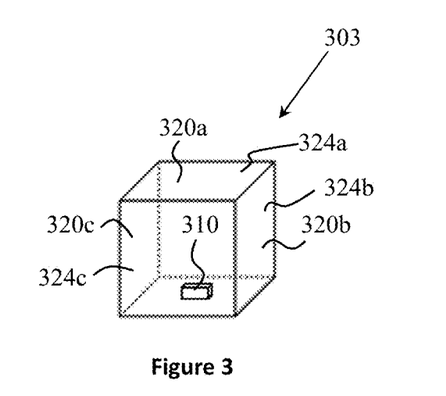
FIG. 3 illustrates a flash device that may be used in conjunction with the mobile phone of FIG. 1 or the image capturing apparatus of FIG. 2.

FIG. 3 illustrates a flash device 303, which is an exemplary embodiment of the flash devices 103 and 203 discussed above. The flash device 303 includes a light emitting element 310 that emits light. The light emitting element 310 may be, for example, a light emitting diode (LED), a xenon lamp, etc. The flash device 303 also includes light controlling elements 320a-c. Each of the light controlling elements 320a-c is individually adjustable to vary a difference between an amount of light received by the light controlling element from the light emitting element 310 and an amount of light that exits the light controlling element. By individually controlling which light controlling element transmits light for the light to exit the flash device 303 through the light controlling element and which light controlling element reflects or absorbs light for the light to not exit the flash device 303 through the light controlling element, the general direction of light emitted by the flash device 303 is controlled.

Figure 4A:
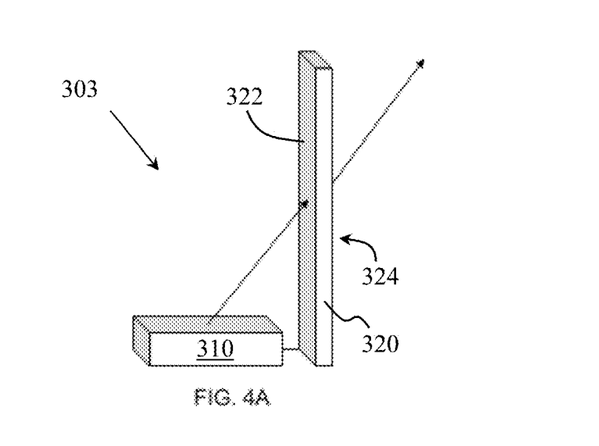
FIGS. 4A-C illustrate schematic views of a flash device including a light emitting element and a light controlling element.
Figure 4B:
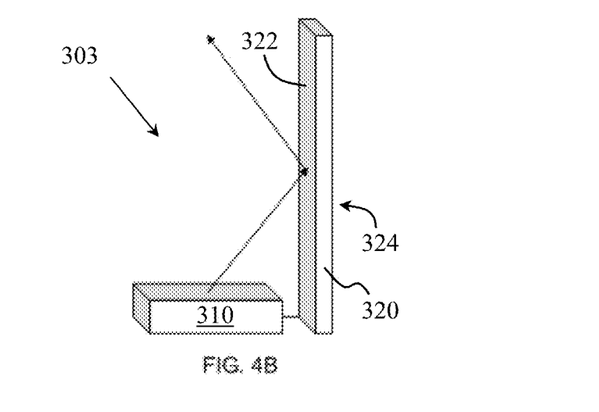
Figure 4C:
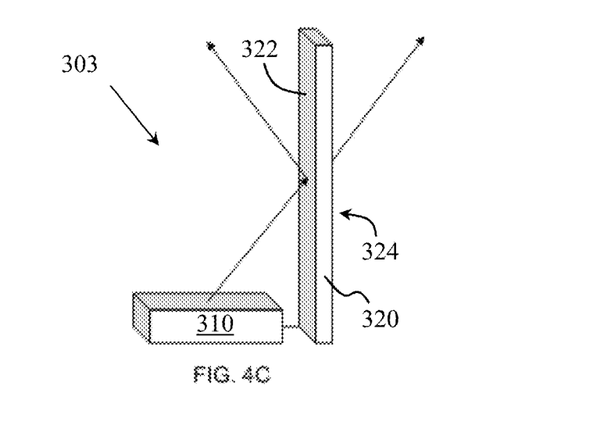

FIGS. 4A-C illustrate schematic views of the flash device 303 including the light emitting element 310 and a light controlling element 320. For purpose of illustration only one light controlling element 320 is illustrated. Each light controlling element, including the illustrated light controlling element 320, includes a light receiving surface 322 and a light exiting surface 324. As discussed briefly above and in more detail below, the light exiting surface 324 of the light receiving element 320 is non-parallel to the light exiting surface of another light controlling element of the flash device 303.

In the embodiment of FIG. 4A, the light controlling element 320 is controlled such that light (represented by arrows) received at the light receiving surface 322 is transmitted through the light controlling element 320 and exits from the light exiting surface 324. In this embodiment, substantially all of the light received at the light receiving surface 322 exits the flash device 203 from the light exiting surface 324.

In the embodiment of FIG. 4B, the light controlling element 320 is controlled such that light (represented by arrows) received at the light receiving surface 322 is not transmitted through the light controlling element 320 or exited from the light exiting surface 324. In the illustrated embodiment, substantially all of the light received at the light receiving surface 322 is reflected back. In another embodiment, substantially all of the light received at the light receiving surface 322 is absorbed by the light controlling element 320. In yet another embodiment, some of the light received at the light receiving surface 322 is reflected back and some is absorbed.

In the embodiment of FIG. 4C, the light controlling element 320 is controlled such that a portion of the light received at the light receiving surface 322 is transmitted through the light controlling element 320 and exited from the light exiting surface 324, while a portion of the light received at the light receiving surface 322 is not transmitted through the light controlling element 320 or exited from the light exiting surface 324. In the illustrated embodiment, some of the light received at the light receiving surface 322 exits the flash device 303 from the light exiting surface 324 and some of the light received at the light receiving surface 322 is reflected back. In another embodiment, some of the light received at the light receiving surface 322 exits the flash device 303 from the light exiting surface 324 and some of the light received at the light receiving surface 322 is absorbed by the light controlling element 320. In yet another embodiment, some of the light received at the light receiving surface 322 exits the flash device 303 from the light exiting surface 324, some of the light received at the light receiving surface 322 is reflected back and some is absorbed.

Therefore, the light controlling element 320 is individually adjustable to vary the difference between the amount of light received at the light receiving surface 322 and the amount of light exited from the light exiting surface 324 such that amounts of light exiting respective non-parallel light exiting surfaces vary to control direction of light emitted by the flash device 303.

In the embodiment of FIG. 3, the flash device 303 includes three light controlling elements 320a-c. The light controlling elements 320a-c have light exiting surfaces 324a-c that are each non-parallel to the light exiting surfaces 324a-c of each other of the three light controlling elements 320a-c. For example, the light controlling element 320a has a light exiting surface 324a that is non-parallel to the light exiting surface 324b of the light controlling element 320b and to the light exiting surface 324c of the light controlling element 320c.

FIGS. 5A-F illustrate additional example embodiments of the flash device 303.

Figure 5A:
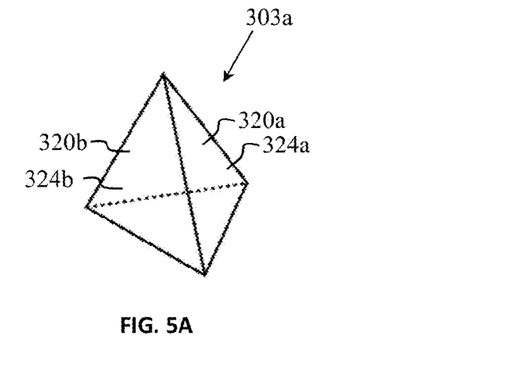
FIG. 5A illustrates an exemplary flash device that has a triangular-based pyramidal shape.

FIG. 5A illustrates an embodiment where the flash device 303a includes two light controlling elements 320a-b. The light controlling elements 320a-b have light exiting surfaces 324a-b that are each non-parallel to each other. The light controlling element 320a has a light exiting surface 324a that is non-parallel to the light exiting surface 324b of the light controlling element 320b. In one embodiment, the flash device 303a includes three light controlling elements, each having a light exiting surface that is non-parallel to the light exiting surfaces of each other of the three light controlling elements.

Figure 5B:
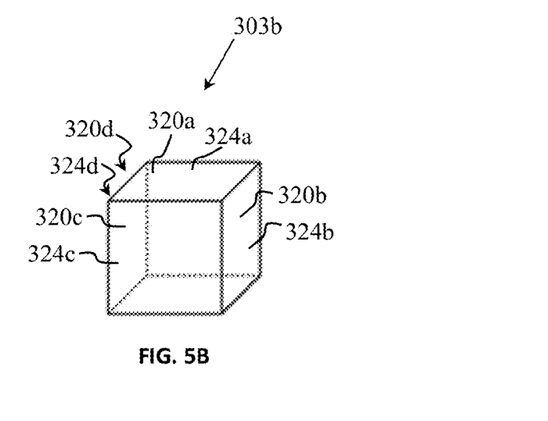
FIG. 5B illustrates an exemplary flash device that includes four light controlling elements 320a-d.

FIG. 5B illustrates an embodiment where the flash device 303b includes four light controlling elements 320a-d. The light controlling elements 320a-d have light exiting surfaces 324a-d. Each of the light exiting surfaces 324a-d is non-parallel to at least one other of the light exiting surfaces 324a-d of the four light controlling elements 320a-d. For example, the light controlling element 320a has a light exiting surface 324a that is non-parallel to the light exiting surface 324b of the light controlling element 320b, to the light exiting surface 324c of the light controlling element 320c, and to the light exiting surface 324d of the light controlling element 320d. The light exiting surface 324b of the light controlling element 320b is non-parallel to the light exiting surface 324a of the light controlling element 320a and to the light exiting surface 324c of the light controlling element 320c. The light exiting surface 324b is not non-parallel to the light exiting surface 324d, but it is in a different plane from the light exiting surface 324d. In one embodiment, a fifth surface of the flash device 303b is also a light exiting surface and thus the flash device 303b of FIG. 5B has five light controlling elements.

Figure 5C:
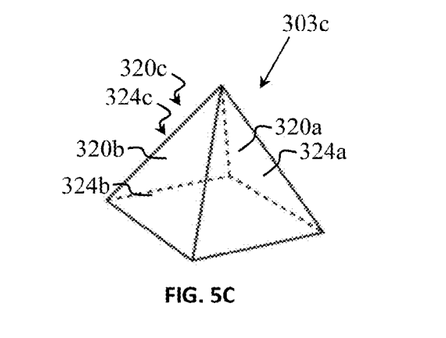
FIG. 5C illustrates an exemplary flash device that has a square-based pyramidal shape.

FIG. 5C illustrates an embodiment where the flash device 303c has a square-based pyramidal shape. In the embodiment of FIG. 5C, the flash device 303c includes three light controlling elements 320a-c. The light controlling elements 320a-c have light exiting surfaces 324a-c that are each non-parallel to the light exiting surfaces 324a-c of each other of the three light controlling elements 320a-c. For example, the light controlling element 320a has a light exiting surface 324a that is non-parallel to the light exiting surface 324b of the light controlling element 320b and to the light exiting surface 324c of the light controlling element 320c. In one embodiment, a fourth surface of the flash device 303c is also a light controlling element and thus the flash device 303c of FIG. 5C has four light controlling elements.

Figure 5D:
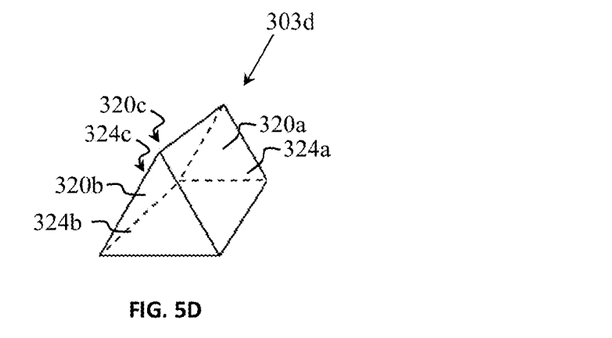
FIG. 5D illustrates an exemplary flash device that has a triangular prism shape.

FIG. 5D illustrates an embodiment where the flash device 303d has a triangular prism shape. In the embodiment of FIG. 5D, the flash device 30d3 includes three light controlling elements 320a-c. The light controlling elements 320a-c have light exiting surfaces 324a-c that are each non-parallel to the light exiting surfaces 324a-c of each other of the three light controlling elements 320a-c. For example, the light controlling element 320a has a light exiting surface 324a that is non-parallel to the light exiting surface 324b of the light controlling element 320b and to the light exiting surface 324c of the light controlling element 320c. In one embodiment, a fourth surface of the flash device 303d is also a light controlling element and thus the flash device 303d of FIG. 5D has four light controlling elements.

Figure 5E:
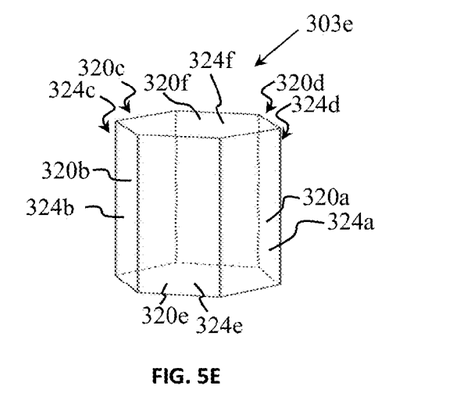
FIG. 5E illustrates an exemplary flash device that has a hexagonal prism shape.

FIG. 5E illustrates an embodiment where the flash device 303e has a hexagonal prism shape. In the embodiment of FIG. 5E, the flash device 303e includes six light controlling elements 320a-f. Each of the light exiting surfaces 324a-f is non-parallel to at least one other of the light exiting surfaces 324a-f of the six light controlling elements 320a-f. For example, the light controlling element 320f has a light exiting surface 324f that is non-parallel to the light exiting surface 324a of the light controlling element 320a, to the light exiting surface 324b of the light controlling element 320b, to the light exiting surface 324c of the light controlling element 320c, to the light exiting surface 324d of the light controlling element 320d, and to the light exiting surface 324e of the light controlling element 320e. The light exiting surface 324a of the light controlling element 320a is non-parallel to the light exiting surface 324b of the light controlling element 320b, to the light exiting surface 324d of the light controlling element 320d, to the light exiting surface 324e of the light controlling element 320e, and to the light exiting surface 324ef of the light controlling element 320ef. The light exiting surface 324a is not non-parallel to the light exiting surface 324c, but it is in a different plane from the light exiting surface 324c. In one embodiment, a seventh surface of the flash device 303e is also a light controlling element and thus the flash device 303e of FIG. 5E has seven light controlling elements.

Figure 5F:
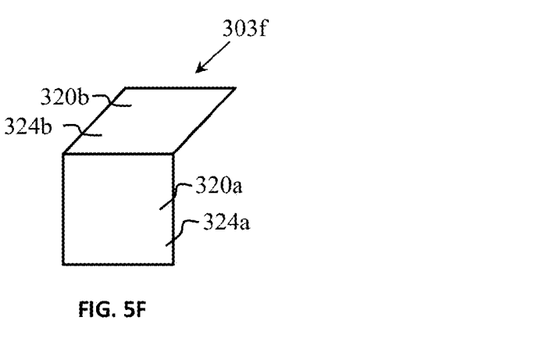
FIG. 5F illustrates an exemplary flash device that includes two light controlling elements.

FIG. 5F illustrates an embodiment where the flash device 303 includes two light controlling elements 320a-b. The light controlling elements 320a-b have light exiting surfaces 324a-b, respectively. The light exiting surfaces 324a-b are non-parallel to each other.

The above embodiments are only examples of potential shapes and combinations of the flash device 303. The flash device 303 may have any of a theoretically infinite number of shapes where light exiting surfaces of the light controlling elements are non-parallel to at least one other light exiting surface of the flash device 303. The flash device 303 may also have surfaces that are at least partially or fully curved, and surfaces with features such as frosting that create effects in the light exiting the flash device 303.

With continued reference to FIGS. 4A-C, the light controlling elements 320 are non-mechanical (e.g., they do not involve tilting or moving of the flash device). In one embodiment, the light controlling elements 320 include smart glass (a.k.a. EGlass, switchable glass, etc.). Smart glass is electrically switchable glass or glazing which changes light transmission properties of the light controlling elements 320 when a voltage is applied hence allowing for control of the amount of light transmitted through the light controlling element 320. Smart glass can change from transparent (FIG. 4A) (i.e., all or most of the light received at the light receiving surface 322 is transmitted through the light controlling element 320 and exited from the light exiting surface 324 while none or very little of the light received at the light receiving surface 322 is reflected or absorbed by the light receiving surface 322) to translucent (FIG. 4B) (i.e., some of the light received at the light receiving surface 322 is transmitted through the light controlling element 320 and exited from the light exiting surface 324 while some of the light received at the light receiving surface 322 is reflected or absorbed by the light receiving surface 322) to opaque or reflective (FIG. 4C) (i.e., none or very little of the light received at the light receiving surface 322 is transmitted through the light controlling element 320 and exited from the light exiting surface 324 while all or most of the light received at the light receiving surface 322 is reflected or absorbed by the light receiving surface 322). Smart glass technologies include electrochromic devices, suspended particle devices (SPD), micro-blinds, liquid crystal devices, and microelectromechanical systems (MEMS) based devices.

In one embodiment, the light controlling elements 320 include electrochromic devices that change light transmission properties in response to voltage and thus allow control over the amount of light passing through the material. In some cases, a burst of electricity is required for changing the light transmission characteristics of the material, but once the change has been effected, no electricity is needed for maintaining the light transmission characteristics which have been achieved. Electrochromic materials such as transition-metal hydride electrochromics include reflective hydrides, which become light reflective rather than light absorbing, and thus switch states between transparent and reflective. Modified porous nano-crystalline films have enabled the creation of structures that consist of several stacked porous layers printed on top of each other on a substrate modified with a transparent conductor such as indium tin oxide (ITO) or Poly(3,4-ethylenedioxythiophene)poly(styrenesulfonate) (PEDOT:PSS). A working electrode may consist of a positive porous semiconductor (e.g., Titanium Dioxide (TiO2)) with adsorbed chromogens. These chromogens change color or shade by reduction or oxidation. A passivator may be used as the negative of the image to improve electrical performance. An insulator layer may serve to increase the contrast ratio and separating the working electrode electrically from a counter electrode. The counter electrode provides a high capacitance to counterbalance the charge inserted/extracted on the SEG electrode and maintain overall device charge neutrality. A conducting carbon layer may be used as the conductive back contact for the counter electrode. The porous monolith structure may be overprinted with a liquid or polymer-gel electrolyte, dried, and then may be incorporated into various encapsulation or enclosures. In one embodiment, the light controlling elements 320 incorporate transition metal hydride electrochromics that switch between a transparent state when they are off to a reflective state when a voltage is applied.

In some embodiments, the light controlling elements 320 are very thin (e.g., 30 micrometers). In other embodiments, the light controlling elements 320 have a thickness other than 30 micrometers. A light controlling element 320 can be switched on by applying an electrical potential to the transparent conducting substrate relative to the conductive carbon layer. This causes a reduction of viologen molecules (coloration or shading) to occur inside the working electrode. By reversing the applied potential or providing a discharge path, the device bleaches. A light controlling elements 320 constructed from electrochromic monolith may be operated at relatively low voltage (e.g., 1 Volt) to change the viologens hence changing the light transmission characteristics of the light controlling element 320.

In one embodiment, the light controlling elements 320 include suspended particle devices (SPD). SPD devices include a thin film laminate of rod-like particles suspended in a fluid is placed between two glass or plastic layers, or attached to one layer. When no voltage is applied, the suspended particles are arranged in random orientations and tend to absorb or reflect light, so that the glass panel is opaque or reflective, respectively. When voltage is applied, the suspended particles align and let light pass.

In one embodiment, the light controlling elements 320 include polymer dispersed liquid crystal devices (PDLCD). PDLCD include liquid crystals that are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the smart glass. The liquid mix of polymer and liquid crystals may be placed between two layers of glass or plastic that include a thin layer of a transparent, conductive material followed by curing of the polymer, thereby forming the basic sandwich structure of the smart glass. Electrodes from a power supply (not shown) are attached to the transparent electrodes. With no applied voltage, the liquid crystals are randomly arranged in the droplets, resulting in scattering of light as it passes through the smart window assembly. This results in translucency. When a voltage is applied to the electrodes, the electric field formed between the two transparent electrodes on the glass causes the liquid crystals to align, allowing light to pass through the droplets with very little scattering and resulting in transparency. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered.

In one embodiment, the light controlling elements 320 include micro-blinds that control the amount of light passing through the light controlling elements 320 in response to an applied voltage. Micro-blinds are composed of rolled thin metal blinds on glass. They are very small and thus practically invisible to the eye. The metal layer is deposited by magnetron sputtering and patterned by laser or lithography process. The glass substrate includes a thin layer of a transparent conductive oxide (TCO) layer. A thin insulator is deposited between the rolled metal layer and the TCO layer for electrical disconnection. With no applied voltage, the micro-blinds are rolled and let light pass through. When there is a potential difference between the rolled metal layer and the transparent conductive layer, the electric field formed between the two electrodes causes the rolled micro-blinds to stretch out and thus block light.

In other embodiments, the light controlling elements 320 include materials or technologies other than smart glass, electrochromic devices, suspended particle devices (SPD), micro-blinds, liquid crystal devices, and microelectromechanical systems (MEMS) based devices.

Figure 6:
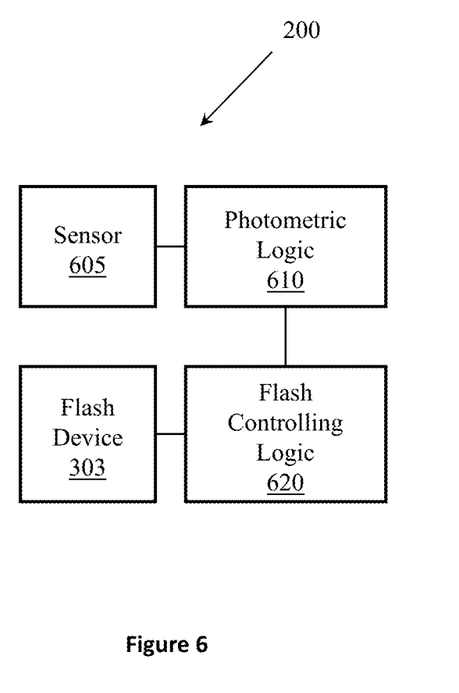
FIG. 6 illustrates a simplified block diagram of an exemplary image capturing apparatus.

FIG. 6 illustrates a simplified block diagram of the exemplary image capturing apparatus 200. The simplified block diagram of FIG. 6 is also applicable to the exemplary phone 100. The image capturing apparatus 200 includes a sensor 605 and a photometric logic 610. The sensor 605 senses light incident on objects in the field of view of the image capturing apparatus 200. In one embodiment, the sensor 605 is used in conjunction with a lens (e.g., fisheye lens) or other optical device to increase or otherwise affect the field of view or field of sensing of the sensor 605. The output of the sensor 605 is transmitted to the photometric logic 610, which measures the light incident on the objects in the field of view of the image capturing apparatus 200. The photometric logic 610 measures photometrically the incident light and converts the photometric output into luminance values (e.g., by logarithmic compression) corresponding to areas, segments, or subjects in the field of view of the image capturing apparatus 200.

The image capturing apparatus 200 includes a flash controlling logic 620 and the flash device 303. The output signal(s) from the photometric logic 610 are inputted into the flash controlling logic 620, which controls the flash device 303 (i.e., the light controlling elements) to control the direction and/or quantity of light emitted by the flash device 303 based on the measurements and calculations made by the photometric logic 610. As discussed above, the light controlling elements are individually adjustable to vary the difference between the amount of light received at the light receiving surface and the amount of light exited from the light exiting surface. The flash controlling logic 620 controls the flash device 303 (i.e., the light controlling elements) and hence the direction and/or quantity of light emitted by the flash device 303 by providing respective stimuli to the light controlling elements based on the measurements and calculations made by the photometric logic 610. In one embodiment, stimuli provided by the flash controlling logic 620 to the light controlling elements are voltages. In other embodiments, the stimuli provided by the flash controlling logic 620 to the light controlling elements are stimuli other than voltages.

Figure 7:
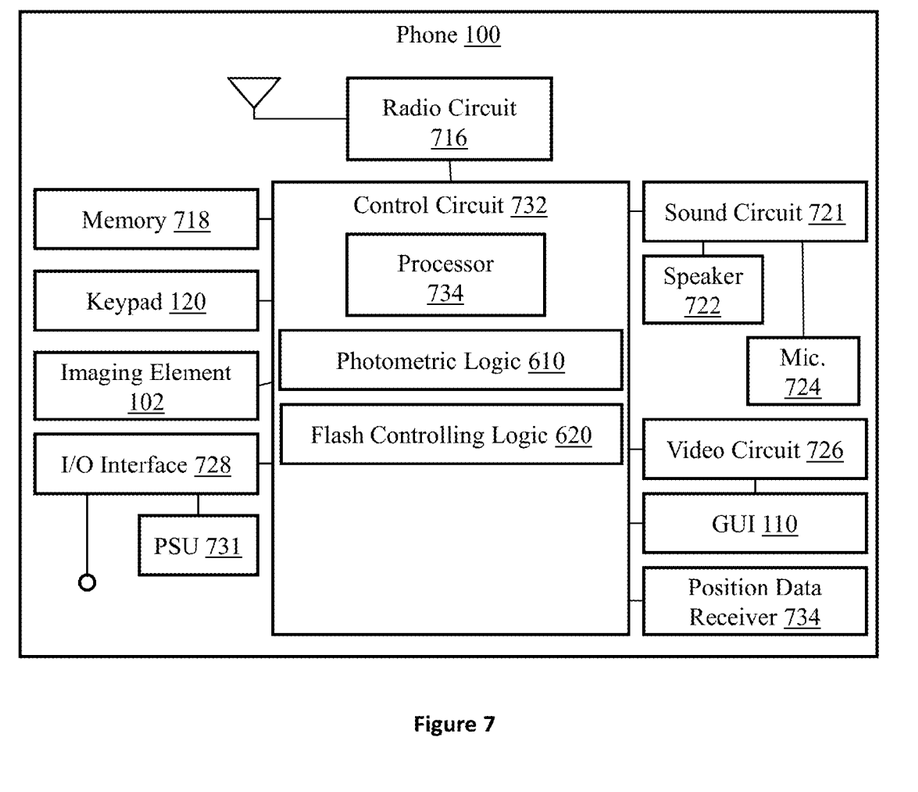
FIG. 7 illustrates a detailed block diagram of an exemplary mobile phone.

FIG. 7 illustrates a detailed block diagram of the exemplary phone 100. The phone 100 includes a control circuit 732 that is responsible for overall operation of the phone 100. For this purpose, the control circuit 732 includes a processor 734 that executes various applications, including applications related to or that form part of the phone 100 functioning as an imaging capturing apparatus including the photometric logic 610 and the flash controlling logic 620.

In one embodiment, the photometric logic 610 and/or the flash controlling logic 620 are embodied in the form of executable logic (e.g., lines of code, software, or a program) that is stored on a non-transitory computer readable medium (e.g., a memory, a hard drive, etc.) of the phone 100 and is executed by the control circuit 732. The described operations may be thought of as a method that is carried out by the phone 100. Variations to the illustrated and described techniques are possible and, therefore, the disclosed embodiments should not be considered the only manner of carrying out phone 100 functions.

The phone 100 further includes the GUI 110, which may be coupled to the control circuit 732 by a video circuit 726 that converts video data to a video signal used to drive the GUI 110. The video circuit 726 may include any appropriate buffers, decoders, video data processors and so forth.

The phone 100 further includes communications circuitry that enables the phone 100 to establish communication connections such as a telephone call. In the exemplary embodiment, the communications circuitry includes a radio circuit 716. The radio circuit 716 includes one or more radio frequency transceivers and an antenna assembly (or assemblies). Since the phone 100 is capable of communicating using more than one standard, the radio circuit 716 represents each radio transceiver and antenna needed for the various supported connection types. The radio circuit 716 further represents any radio transceivers and antennas used for local wireless communications directly with an electronic device, such as over a Bluetooth interface.

As indicated, the phone 100 includes the primary control circuit 732 that is configured to carry out overall control of the functions and operations of the phone 100. The processor 734 of the control circuit 732 may be a central processing unit (CPU), microcontroller or microprocessor. The processor 734 executes code stored in a memory (not shown) within the control circuit 732 and/or in a separate memory, such as a memory 718, in order to carry out operation of the phone 100. The memory 718 may be, for example, one or more of a buffer, a flash memory, a hard drive, a removable media, a volatile memory, a non-volatile memory, a random access memory (RAM), or other suitable device. In a typical arrangement, the memory 718 includes a non-volatile memory for long term data storage and a volatile memory that functions as system memory for the control circuit 732. The memory 718 may exchange data with the control circuit 732 over a data bus. Accompanying control lines and an address bus between the memory 718 and the control circuit 732 also may be present. The memory 718 is considered a non-transitory computer readable medium.

The phone 100 may further include a sound circuit 721 for processing audio signals. Coupled to the sound circuit 721 are a speaker 722 and a microphone 724 that enable a user to listen and speak via the phone 100, and hear sounds generated in connection with other functions of the device 100. The sound circuit 721 may include any appropriate buffers, encoders, decoders, amplifiers and so forth.

The phone 100 may further include a keypad 120 that provides for a variety of user input operations as described above in reference to FIG. 1. The phone 100 may further include one or more input/output (I/O) interface(s) 728. The I/O interface(s) 728 may be in the form of typical electronic device I/O interfaces and may include one or more electrical connectors for operatively connecting the phone 100 to another device (e.g., a computer) or an accessory (e.g., a personal handsfree (PHF) device) via a cable. Further, operating power may be received over the I/O interface(s) 728 and power to charge a battery of a power supply unit (PSU) 731 within the phone 100 may be received over the I/O interface(s) 728. The PSU 731 may supply power to operate the phone 100 in the absence of an external power source.

The phone 100 also may include various other components. For instance, the imaging element 102 may be present for taking digital pictures and/or movies. Image and/or video files corresponding to the pictures and/or movies may be stored in the memory 718. As another example, a position data receiver 734, such as a global positioning system (GPS) receiver, may be present to assist in determining the location of the phone 100.

Figure 8:
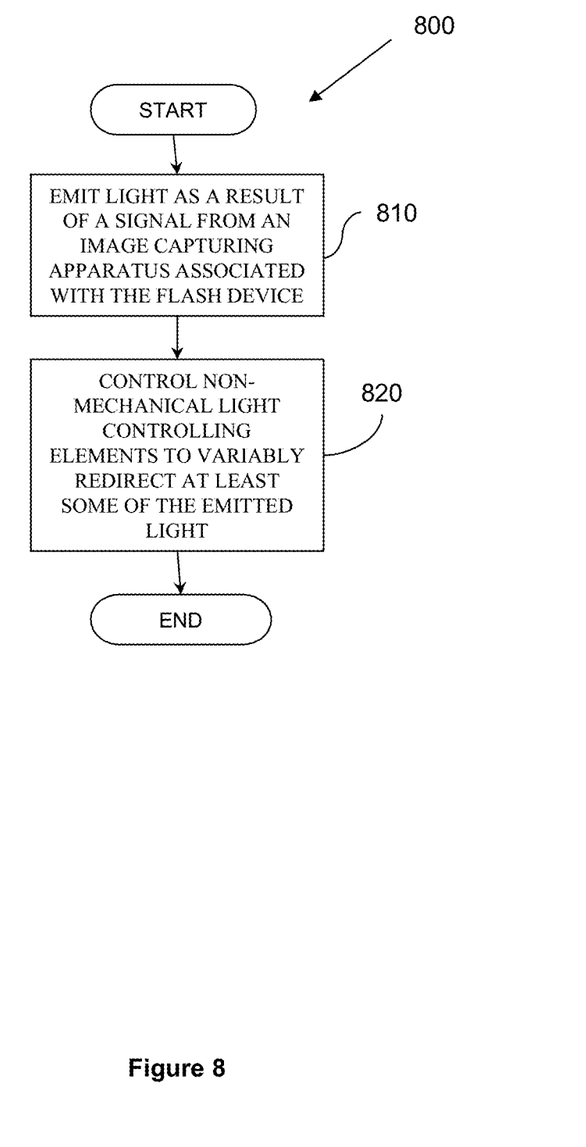
FIG. 8 illustrates a flowchart showing the logical flow of an exemplary method of controlling direction and/or intensity of light associated with a flash device.
Figure 9:
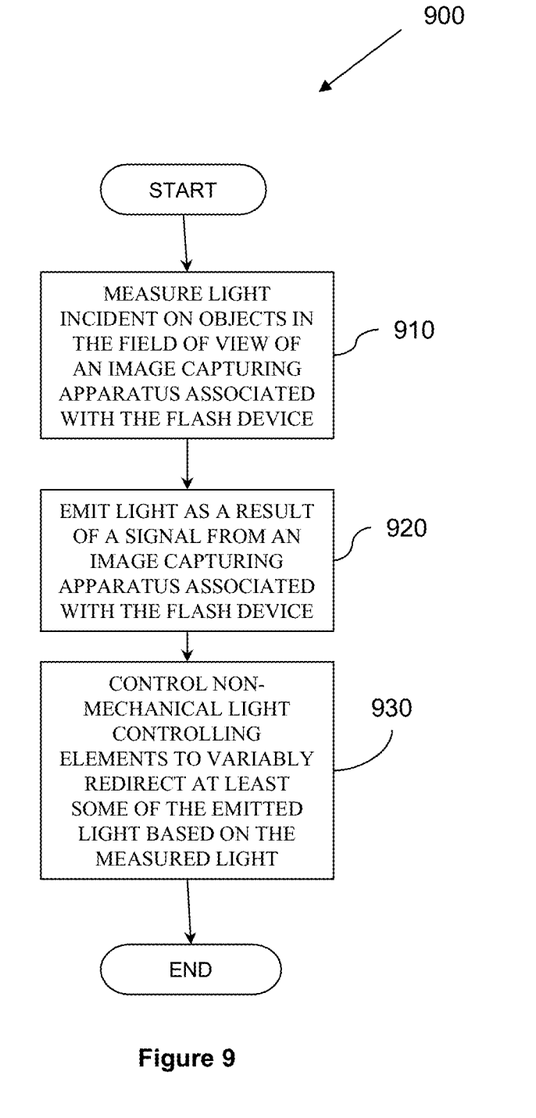
FIG. 9 illustrates a flowchart showing the logical flow of an exemplary method of controlling direction and/or intensity of light associated with a flash device.

Referring now to FIGS. 8 and 9, flowcharts are shown that illustrate logical operations to implement exemplary methods of controlling direction and/or amount of light associated with a flash device. The exemplary methods may be carried out by executing embodiments of the mobile telephones, flash devices or image capturing apparatuses disclosed herein, for example. Thus, the flowcharts of FIGS. 8 and 9 may be thought of as depicting steps of a method carried out in the above-disclosed mobile telephones, flash devices or image capturing apparatuses by operation of hardware, software, or combinations thereof. Although FIGS. 8 and 9 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 8, logical flow of a method 800 of controlling direction and/or intensity of light associated with a flash device may begin at 810 by emitting light as a result of a signal from an image capturing apparatus associated with the flash device. At 820, the method 800 includes controlling non-mechanical light controlling elements to variably redirect at least some of the emitted light. The non-mechanical light controlling elements are configurable to variably at least partially transmit or at least partially reflect at least a portion of the emitted light such that the portion of the light exits the flash device in a direction non-parallel to an optical axis of the image capturing apparatus.

In one embodiment, the controlling non-mechanical light controlling elements to variably redirect at least some of the emitted light may be based on user input setting a desired direction and/or intensity of light associated with the flash device.

In reference to FIG. 9, logical flow of a method 900 of controlling direction and/or intensity of light associated with a flash device may begin at 910 by measuring light incident on objects in the field of view of an image capturing apparatus associated with the flash device. At 920, the method 900 includes emitting light as a result of a signal from the image capturing apparatus associated with the flash device. At 930, the method 900 includes controlling non-mechanical light controlling elements to variably redirect at least some of the emitted light. The non-mechanical light controlling elements are controlled to variably at least partially transmit or at least partially reflect or absorb at least a portion of the emitted light such that the portion of the light exits the flash device in a direction non-parallel to an optical axis of the image capturing apparatus based on the measured light in the field of view of the image capturing apparatus.

In one embodiment, the controlling the non-mechanical light controlling elements of methods 800 and 900 include controlling the non-mechanical light controlling elements such that portions of the emitted light exit the flash device in multiple directions non-parallel to the optical axis of the image capturing apparatus. In another embodiment, the controlling the non-mechanical light controlling elements includes controlling the non-mechanical light controlling elements such that the portion of the emitted light exits the flash device substantially in a direction outside the field of view of the image capturing apparatus.

Although certain embodiments have been shown and described, it is understood that equivalents and modifications falling within the scope of the appended claims will occur to others who are skilled in the art upon the reading and understanding of this specification.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 524 (2d. Ed. 1995).

What is claimed is:

1. An image capturing apparatus comprising:
 a photometric logic configured to measure light incident on objects in the field of view of the image capturing apparatus;
 a flash device comprising:
  a light emitting element configured to emit light, and
  light controlling elements comprising:
   a light receiving surface, and
   a light exiting surface that is non-parallel to the light exiting surface of at least one other light controlling element of the flash device,
   wherein the light controlling elements are individually adjustable to vary a difference between an amount of light received at the light receiving surface and an amount of light exited from the light exiting surface; and
 a flash controlling logic operatively connected to the photometric logic and the flash device and configured to control the light controlling elements to vary the difference between the amount of light received at the light receiving surfaces and the amount of light exited from the non-parallel light exiting surfaces based on the measured light incident on objects in the field of view of the image capturing apparatus, wherein the flash controlling logic is configured to vary the difference between the amount of light received at the light receiving surfaces and the amount of light exited from the light exiting surfaces individually for the light controlling elements to control direction of light emitted by the flash device.

2. The image capturing apparatus of claim 1, wherein the light controlling elements include three light controlling elements, wherein respective light exiting surfaces of the three light controlling elements are each non-parallel to the light exiting surfaces of each other of the three light controlling elements.

3. The image capturing apparatus of claim 1, wherein the light controlling elements include four light controlling elements, wherein the light exiting surfaces of the four light controlling elements are non-parallel to at least one of the light exiting surfaces of each other of the four light controlling elements.

4. The image capturing apparatus of claim 1, wherein the flash controlling logic is configured to control the light controlling elements for the light controlling elements to interchangeably transmit, absorb, or reflect at least a portion of the light emitted by the light emitting element.

5. The image capturing apparatus of claim 1, comprising:
an imaging element having an optical axis,
wherein the light controlling elements include at least one light controlling element comprising a light exiting surface having a normal that is non-parallel to the optical axis of the imaging element.

6. The image capturing apparatus of claim 1, comprising:
an imaging element having an optical axis,
wherein the light controlling elements include at least one light controlling element comprising a light exiting surface having a normal that is substantially orthogonal to the optical axis of the imaging element.

7. The image capturing apparatus of claim 1, comprising:
an imaging element having an optical axis,
wherein the light controlling elements include at least one light controlling element comprising a light exiting surface disposed relative to the optical axis of the imaging element such that at least some of the light emitted by the light emitting element exits the flash device substantially in a direction outside the field of view of the image capturing apparatus.

8. The image capturing apparatus of claim 1, wherein the light controlling elements comprise smart glass configured to change light transmission properties of the light controlling elements in response to a stimulus.

9. A method of controlling direction of light associated with a flash device, the method comprising:
emitting light as a result of a signal received;
controlling non-mechanical light controlling elements to variably redirect at least some of the emitted light; and
at least partially by means of the non-mechanical light controlling elements variably transmit, absorb, or reflect a portion of the emitted light such that in a first setting the portion exits the flash device in a first direction and in a second setting the portion exits the flash device in a second direction orthogonal to the first direction.

10. The method of claim 9, comprising:
measuring light incident on objects in the field of view of the image capturing apparatus,
wherein the controlling the non-mechanical light controlling elements is based on the light measurement.

11. The method of claim 9, wherein the controlling the non-mechanical light controlling elements includes controlling the non-mechanical light controlling elements such that portions of the emitted light exit the flash device in multiple directions excluding a direction that is parallel to the optical axis of an image capturing apparatus associated with the flash device.

12. The method of claim 9, wherein the controlling the non-mechanical light controlling elements includes controlling the non-mechanical light controlling elements such that the portion of the emitted light exits the flash device substantially in a direction outside the field of view of an image capturing apparatus associated with the flash device.

13. A flash device comprising:
a light emitting element configured to emit light, and
light controlling elements comprising:
a light receiving surface, and
a light exiting surface that is non-parallel to the light exiting surface of at least one other light controlling element of the flash device,
wherein the light controlling elements are individually adjustable to vary a difference between an amount of light received at the light receiving surface and an amount of light exited from the light exiting surface such that amounts of light exiting respective non-parallel light exiting surfaces vary to control direction of light emitted by the flash device.

14. The flash device of claim 13, wherein the light controlling elements include three light controlling elements, wherein respective light exiting surfaces of the three light controlling elements are each non-parallel to the light exiting surfaces of each other of the three light controlling elements.

15. The flash device of claim 13, wherein the light controlling elements include four light controlling elements, wherein the light exiting surfaces of the four light controlling elements are non-parallel to at least one of the light exiting surfaces of each other of the four light controlling elements.

16. The flash device of claim 13, wherein the light controlling elements are configurable to interchangeably transmit or reflect at least a portion of the light emitted by the light emitting element.

17. The flash device of claim 13, wherein the light controlling elements include at least one light controlling element comprising a light exiting surface having a normal that is non-parallel to an optical axis of an imaging element associated with an image capturing apparatus working in conjunction with the flash device.

18. The flash device of claim 13, wherein the light controlling elements include at least one light controlling element comprising a light exiting surface having a normal that is substantially orthogonal to an optical axis of an imaging element associated with an image capturing apparatus working in conjunction with the flash device.

19. The flash device of claim 13, wherein the light controlling elements include at least one light controlling element comprising a light exiting surface disposed relative to an optical axis of an imaging element of an image capturing apparatus working in conjunction with the flash device such that at least some of the light emitted by the light emitting element exits the flash device substantially in a direction outside a field of view of the image capturing apparatus working in conjunction with the flash device.

20. The flash device of claim 13, wherein the light controlling elements comprise smart glass configured to change light transmission properties of the light controlling elements in response to a stimulus.

* * * * *